United States Patent Office

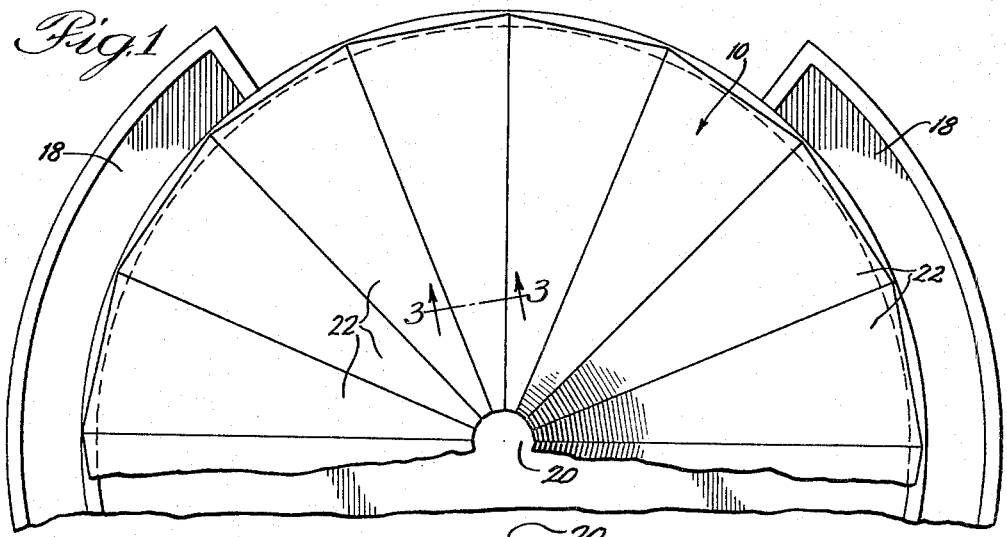
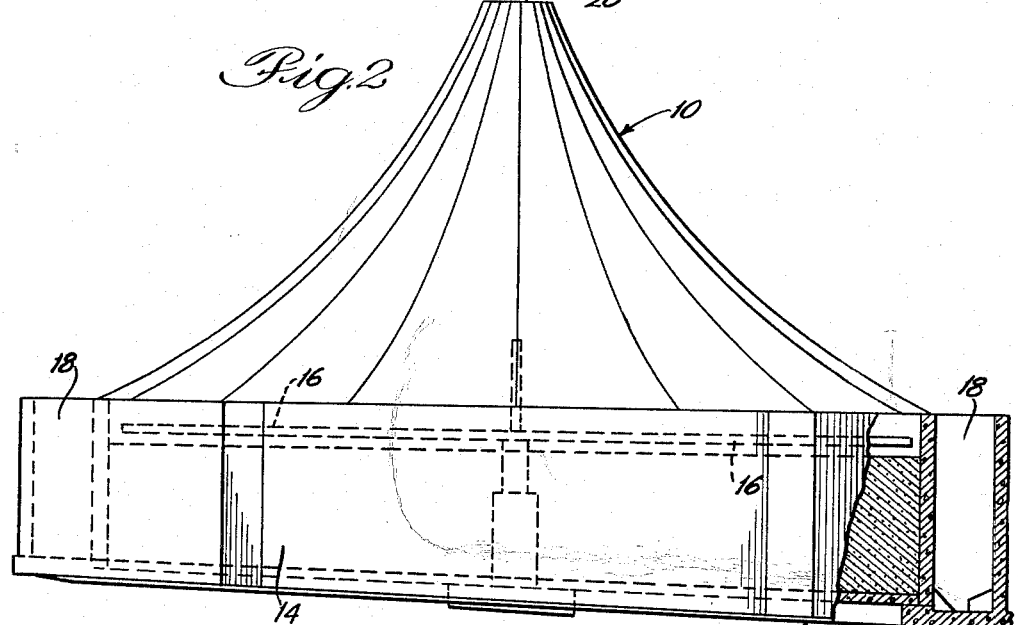

3,176,845
FILTER ROOF
Robert E. Schenk, % Schenk Engr. Co., 228 Waterloo Bldg., Waterloo, Iowa
Filed Jan. 10, 1963, Ser. No. 255,419
2 Claims. (Cl. 210—150)

This application relates generally to waste treating apparatus, and more particularly to new and improved filter bed cover structures utilized in waste treating operations. This application is a continuation-in-part of my co-pending application, Serial No. 37,228, filed June 20, 1960, and now abandoned.

It is known to treat waste, such as sewage, and the like, by the use of a biological filter bed wherein air is caused to flow through the filter bed to reduce the waste in a manner well-known to those skilled in the art. It is also customary to provide covers for such filter beds but, for the reasons set forth hereinbelow, such prior art structures have not proved entirely satisfactory with respect to obtaining optimum efficiency in the waste treatment process.

Accordingly, it is a general object of this invention to provide a new and improved filter bed cover structure.

It is a further object of this invention to provide a filter bed cover which serves to enhance and provide uniformity to the air flow through the filter to facilitate the waste reduction process.

In accordance with the features of one specific illustrative embodiment of the invention, the improved filter bed cover is provided with an internal configuration which advantageously may be generally convex in shape. The filter bed cover is provided with an air opening at the upper end thereof and tapers upwardly and inwardly towards said air opening from a bottom opening of larger diameter such that the cover has a continuous inner convex surface in which the diameter decreases as a function of its height.

As a result of this unique construction, the air supply to the filter is enhanced and made uniform by the increased up draft or air flow which passes through the filter bed in its movement towards the air opening at the top of the filter bed cover.

Those skilled in the waste treating art appreciate that oxidation is required for complete breakdown of the wastes in the filter media. Thus, oxygen is a very important factor in converting sewage into a safe liquid or effluent which may be disposed of without creating a nuisance or a focal point of infection.

The filter bed covers of the prior art do not provide optimum air flow through the filter media. In fact, the filter bed covers as have been used heretofore are directed only towards providing a protection for the filter bed and have not served to improve the efficiency of the waste treating process as such.

These prior art deficiencies are overcome by the unique arrangement of the invention wherein the filter bed cover is formed with a particular internal curvature that serves to improve degree and uniformity of the air flow through the filter media in the filter bed. In the practical embodiments of the invention, air is drawn upwardly through the filter media in a greatly enhanced and more uniform manner as a result of the continuous inner convex configuration of the filter bed cover and the oxidation of the waste can be accomplished in an optimum manner.

In accordance with a further feature of this invention, a novel filter bed cover advantageously is formed of a rigid lightweight material that further serves to increase the efficiency of the waste treating process. Thus, it is contemplated that the filter bed cover be formed of a suitable plastic, such as fiberglass, or the like. While there is usually some elevation of the temperature within the filter due to organic activity, the use of a fiberglass filter bed cover constructed in accordance with the present invention provides additional temperature elevation due to solar heating, which further facilitates the air flow through the filter media and the resultant oxidation thereof.

Thus, it is another object of this invention to provide a new and improved filter bed cover having a continuous internal convex surface which tapers upwardly and inwardly from the bottom of the cover adjacent the filter bed to the air opening at the top of said cover.

It is still another object of this invention to provide an improved filter bed cover as above, having a continuous inner convex surface in which the diameter decreases as a function of the cover height.

It is a further object of this invention to provide an improved filter bed cover formed of a lightweight, rigid, plastic material, such as fiberglass or the like, which permits solar heating of the filter bed to enhance the air flow therethrough and thereby increases the oxidation of the waste.

It is a still further object of this invention to provide a filter bed cover, as above, which is characterized by its relative lightness, rigidity, and by the highly desirable function of increasing the degree and uniformity of the air flow through the filter bed.

The novel features which are characteristic of the invention are set forth with particularity in the appended claims. The invention itself, however, both as to its organization and method of operation together with further objects and advantages thereof will best be understood by reference to the following description taken in conjunction with the accompanying drawings in which:

FIGURE 1 is a top plan view partially broken of one illustrative embodiment of the filter bed cover constructed in accordance with the invention;

FIGURE 2 is an elevational view, partly in cross-section, of the filter bed cover and filter bed arrangement of FIGURE 1; and FIGURE 3 is a cross-sectional view of the filter bed cover taken substantially as shown along line 3—3 of FIGURE 1.

Referring now to the drawing, and more particularly to FIGURES 1 and 2 thereof, there is shown one specific illustrative embodiment of the filter bed and cover arrangement in accordance with the invention. While the filter bed cover 10 is shown to be generally circular in horizontal cross-section, those skilled in the art will readily appreciate that this particular form is for purposes of illustration only, and that many other forms of filter bed covers may be constructed embodying the principles of the present invention.

The filter bed cover 10 is positioned upon a filter bed structure 12 which is of conventional construction and arrangement. As well known to those skilled in the art, the filter bed 12 may comprise a chamber 14 within which the filter materials are positioned for receiving the waste, such as sewage, during the waste treatment process. The filter bed 12 is further provided with a suitable waste distributor 16 and underdrain 19. As shown in FIGURES 1 and 2, the filter bed chamber 14 has positioned therearound the channel members or gallery 18 which function with the filter bed in a well-known manner to provide reduction of the waste media in the filter bed. Thus, the gallery 18 permits the outside air to pass through the underdrain 19 so that the air can rise up through and ventilate the filter media within the chamber 14.

Normally, the reduction of the waste in the filter bed is effected by bacterial, protozoan and other activity in the presence of oxygen provided by air flow upwardly through the filter bed. The oxidation afforded by this activity and ventilation of the filter bed serves to break down the wastes and to convert the sewage to a safe liquid which may be disposed of in a safe manner.

The degree and uniformity of this air flow through the filter bed is greatly enhanced in accordance with a feature of this invention by a unique construction of a filter bed cover 10 positioned over the filter bed 12. As clearly shown in FIGURES 1 and 2 of the drawing, the filter bed cover 10 is provided with an air opening 20 at the upper end thereof which is of smaller diameter than the opening at the lower end of the filter bed cover 10 adjacent the filter bed 12. Advantageously, the internal surface of the filter bed cover 10 is generally convex in shape in the vertical cross section such that the filter bed cover tapers upwardly and inwardly in a continuous manner towards the air opening 20 from its bottom opening of a larger diameter. Thus, the cover 10 has a continuous inner arcuate surface in which the diameter decreases as a function of the height of the filter bed cover.

As a result of this particular configuration of filter bed cover, the degree and uniformity of air flow or updraft through the waste media in the filter bed 12 is greatly enhanced, and the reduction of the waste media is obtained in a much more efficient manner than was available in the prior art with uncovered filter beds or with filter beds having covers of different configuration.

Those skilled in the art will appreciate that uniformity of ventilation in waste treatment filters is of paramount imporatnce because equipment manufacturers have gone to great lengths to design and provide machines which will supply liquid waste in a uniform manner to the filter media. Biological filtration is an aeorobic process, and when insufficient air is available in a part of a filter, it plugs up and loses its effectiveness. Advantageously, every square foot of filter media should be dosed with the same amount of waste, and therefore, uniform ventilation through the filter media is highly desirable.

The unique filter roof of the present invention serves to enhance and provide uniformity to the flow of air through the filter media in the filter bed. Thus, all of the air which enters the filter through the underdrains must go out through the opening at the top of the filter roof. Considering the novel filter roof as a modified Venturi, and using conservation of energy similar to its exemplification in Bernoulli's theorem, it will be appreciated that the velocity head of the moving air is constantly increasing as it nears the top of the filter roof, while the pressure head is constantly decreasing.

Further, the movement of air toward the lowered pressure head is along a mathematically continuous path, since the shape of the novel filter roof in the vertical plane must be expressed mathematically as circular, parabolic, hyperbolic, etc. It is an important feature of the invention that the roof have no mathematical discontinuities in the vertical plane. As a result, there are no sudden changes in direction of air flow to cause sudden accelerations normal to the direction of air flow, thereby avoiding the turbulence and non-uniform air flow of conventional roofs.

In addition to the increased efficiency of waste reduction resulting from the enhanced air flow through the filter media provided by the cover 10, it is a further feature of this invention that the filter bed cover 10 be formed of a material enabling a solar heating effect to be attained within the filter bed. Thus, those skilled in the art appreciate that there normally is some elevation of the temperature within the filter bed as a result of the organic activity therein. The filter bed temperatures may be further increased by solar heating thereof if the filter bed cover 10 is constructed of a suitable material, such as fiberglass or the like, which enables this effect to take place. The use of such lightweight, rigid, plastic materials, such as fiberglass or the like, provides this desirable solar heating effect so that the combination of the particular convex configuration of the cover 10 together with the use of a material permitting solar heating of the filter bed results in a highly efficient, greatly enhanced waste treating process.

Further, it is contemplated that the particularly shaped lightweight cover 10 may be constructed in a highly efficient manner, as particularly illustrated in FIGURE 3 of the drawing. As there shown, the filter bed cover 10 is provided with a plurality of curved segments 22 which advantageously may be prefabricated at a factory in advance of its construction into the filter bed cover 10. Each segment 22 can then be transported to the site of the sewage treatment plant, erected in position, and held in place to form the completed filter bed structure.

In accordance with one illustrative embodiment of the invention, each segment 22 is formed with an outwardly extending elongated flange 24 at the side edges thereof so that the flanges 24 of a pair of adjacent sections 22 provide a V-shaped opening 26 therebetween when the sections are placed into position during the fabrication of the filter bed cover 10.

Advantageously, the sections 22 may be held in place by temporary clamps holding the flanges 24 and the sections are firmly and permanently joined together by the use of a suitable bonding material inserted between the flanges. Where the sections 22 are formed of fiberglass, advantageously, a fiberglass gun may be used to spray fiberglass 28 into the small V-shaped openings 26 between adjacent sections 22. This will serve to securely bond all of the segments 22 into an integral unit which despite its light weight, will be rigid and structurally strong enough to withstand all adverse conditions during normal use thereof.

After the sections 22 are joined, in any suitable manner, such as described above, the filter bed cover 10 may be secured to the concrete wall of the filter bed 12 by any suitable bonding material such as the resins which are now available for bonding plastic to concrete.

It is again pointed out that while the unique filter bed cover 10 may be formed of fiberglass sections as described above, in one particular illustrative embodiment of the invention, its use is not limited to any particular material, and if desired, other materials, such as pre-cast concrete could be used for the segments 22 of the cover 10.

While there has been shown and described one specific illustrative embodiment of the present invention, it will, of course, be understood that various other modifications and alternative constructions may be made without departing from the true spirit and scope of the invention. Therefore, it is intended to cover by the appended claims all such modifications and alternative constructions as fall within their true spirit and scope.

What is claimed as the invention is:

1. In combination with a filter bed for use in the treating of wastes, underdrain means for supporting said filter media and for permitting air to pas through said filter media to ventilate the latter, a filter bed cover positioned over the filter bed and comprising a body of rigid material having a bottom air opening of relatively large diameter formed at its lower end adjacent said filter bed and a top air opening of relatively small diameter formed at its upper end, the diameter of said bottom air opening being several times larger than the diameter of said top air opening, said body of rigid material tapering continuously upwardly and inwardly from the bottom air opening to the top air opening such that there are no sudden changes of air flow to cause sudden accelerations normal to the direction of air flow, said body providing an inner convex surface in the vertical plane defining a continuous enclosure having a horizontal cross-section which decreases as a function of the height of said body to enhance and provide uniformity to the flow of air through the filter media in the filter bed, the horizontal cross section of said body and said air openings being substantially circular.

2. In combination with a filter bed for use in the treating of wastes, a filter bed cover positioned over the filter bed and comprising a body of rigid material having a bottom air opening of relatively large diameter formed at its lower end adjacent said filter bed and a top air opening of relatively small diameter formed at its upper end, the diameter of said bottom air opening being several times larger than the diameter of said top air opening, said body of rigid material tapering continuously upwardly and inwardly from the bottom air opening to the top air opening to provide a continuous convex inner arcuate surface in the vertical plane defining an enclosure having a horizontal cross-section which decreases as a function of the height of said body, said enclosure providing a mathematically continuous air flow path in a vertical direction, to enhance and provide uniformity to the flow of air through the waste media in the filter bed, the horizontal cross section of said body and said air openings being substantially circular, said body being formed of a plurality of sections which are connected together to form an integral body assembly, each of said sections comprising an elongated, extended flange member at each of its side edges, the joining flange members of each pair of adjacent sections serving to add structural strength to the body and providing a space therebetween for enabling said adjacent sections to be bonded together.

References Cited by the Examiner

UNITED STATES PATENTS 2,556,944   6/51   Rhyner.

OTHER REFERENCES

"Sewage and Industrial Wastes" (Johnson), published by Federation of Sewage and Industrial Wastes Associations (Champaign, Ill.) 1952, pages 135–148.

REUBEN FRIEDMAN, *Primary Examiner.*

HARRY B. THORNTON, *Examiner.*